(12) United States Patent
Al Nahlaoui et al.

(10) Patent No.: US 11,535,242 B2
(45) Date of Patent: Dec. 27, 2022

(54) METHOD FOR DETECTING AT LEAST ONE OBJECT PRESENT ON A MOTOR VEHICLE, CONTROL DEVICE, AND MOTOR VEHICLE

(71) Applicant: Volkswagen Aktiengesellschaft, Wolfsburg (DE)

(72) Inventors: Yasser Al Nahlaoui, Wolfsburg (DE); Simon Schliecker, Wolfenbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 299 days.

(21) Appl. No.: 16/955,303

(22) PCT Filed: Aug. 21, 2018

(86) PCT No.: PCT/EP2018/072537
§ 371 (c)(1),
(2) Date: Jun. 18, 2020

(87) PCT Pub. No.: WO2019/120643
PCT Pub. Date: Jun. 27, 2019

(65) Prior Publication Data
US 2021/0086760 A1    Mar. 25, 2021

(30) Foreign Application Priority Data

Dec. 19, 2017   (DE) .................... 10 2017 223 160.2

(51) Int. Cl.
*B60W 30/06*  (2006.01)
*B60W 60/00*  (2020.01)
(Continued)

(52) U.S. Cl.
CPC .......... *B60W 30/06* (2013.01); *B60W 60/001* (2020.02); *G06V 20/56* (2022.01); *G08G 1/141* (2013.01); *B60W 2420/403* (2013.01)

(58) Field of Classification Search
CPC ............... B60W 30/06; B60W 60/001; B60W 2420/403; B60W 30/08; B60W 30/18027;
(Continued)

(56) References Cited

U.S. PATENT DOCUMENTS

| 2001/0019356 A1 | 9/2001 | Takeda et al. ................. 348/119 |
| 2003/0165268 A1 | 9/2003 | Franz ............................ 382/181 |

(Continued)

FOREIGN PATENT DOCUMENTS

| DE | 102010009889 A1 | 9/2011 | .............. E05F 15/20 |
| DE | 102013020435 A1 | 6/2014 | ............ B60W 30/08 |

(Continued)

OTHER PUBLICATIONS

International Search Report and Written Opinion, Application No. PCT/EP2018/072537, 18 pages, dated Oct. 5, 2018.

(Continued)

*Primary Examiner* — Jonathan M Dager
*Assistant Examiner* — Jean W Charleston
(74) *Attorney, Agent, or Firm* — Slayden Grubert Beard PLLC

(57) ABSTRACT

The invention relates to a method for detecting at least one object present on a motor vehicle, wherein by way of a control device, at least one camera image is captured by means of a camera, wherein a detection region of the camera is directed to an outer region of the motor vehicle, and partially or entirely to an outer surface of the motor vehicle. The invention proposes that for a clearance test in the at least one camera image, it is checked by an image analysis device of the control device, if at least one predetermined intrinsic structure of the motor vehicle is imaged, and in the event that at least one intrinsic structure cannot be found by the image analysis device, a blocking signal, which indicates that an object is present on the motor vehicle is generated.

15 Claims, 3 Drawing Sheets

(51) Int. Cl.
*G08G 1/14* (2006.01)
*G06V 20/56* (2022.01)

(58) Field of Classification Search
CPC ............ B60W 40/02; B60W 2420/42; B60W 2552/50; G06V 20/56; G06V 20/58; G06V 10/56; G08G 1/141; H04N 7/181; H04N 7/18; B60R 21/0134; B60R 1/00; G05D 1/0088; G05D 1/0238; G05D 1/0246; G05D 2201/0213; G06K 9/6201; B60Y 2300/08; B60Y 2300/18025
USPC .......................................................... 701/24
See application file for complete search history.

(56) References Cited

U.S. PATENT DOCUMENTS

| | | | |
|---|---|---|---|
| 2005/0074142 A1 | 4/2005 | Ertl et al. ..................... 382/104 |
| 2008/0074067 A1 | 3/2008 | Rhodes et al. ............... 318/280 |
| 2010/0082206 A1 | 4/2010 | Kollar et al. .................. 701/49 |
| 2011/0215916 A1 | 9/2011 | Boehme et al. .............. 340/436 |
| 2014/0207344 A1 | 7/2014 | Ihlenburg et al. ............. 701/49 |
| 2015/0054950 A1* | 2/2015 | Van Wiemeersch ......................... G06T 7/0008 382/104 |
| 2015/0360625 A1 | 12/2015 | Randler et al. ............... 348/148 |
| 2017/0114583 A1 | 4/2017 | Banvait et al. .................... 49/28 |
| 2018/0086262 A1* | 3/2018 | Morel ..................... G06V 10/60 |
| 2018/0186290 A1* | 7/2018 | Ward ........................ B60R 1/00 |
| 2018/0288848 A1* | 10/2018 | Gao ........................ H05B 45/14 |
| 2018/0330526 A1* | 11/2018 | Corcoran ............... H04N 7/181 |
| 2018/0357772 A1* | 12/2018 | Takemura ................. B60R 1/00 |
| 2019/0011927 A1* | 1/2019 | Mou ....................... G06T 7/254 |
| 2019/0018415 A1* | 1/2019 | Netter ............... B60W 50/0097 |
| 2019/0049992 A1* | 2/2019 | Riess ..................... G08G 1/166 |
| 2019/0057264 A1* | 2/2019 | Schmidt ............... G06V 20/597 |

FOREIGN PATENT DOCUMENTS

| | | | |
|---|---|---|---|
| DE | 102016118949 A1 | 4/2017 | ............ B62D 25/12 |
| DE | 102016218425 A1 | 3/2018 | ............ B60R 16/02 |
| DE | 102017223160 A1 | 6/2019 | ............ B60W 40/00 |
| EP | 1330132 A2 | 7/2003 | ............... G06T 7/00 |
| EP | 1394761 A2 | 3/2004 | ............... B60R 1/00 |
| EP | 2500218 A1 | 9/2012 | ............... B60R 1/00 |
| EP | 2995519 A1 | 3/2016 | .......... B60W 30/095 |
| WO | 2019/120643 A1 | 6/2019 | ............... B60R 1/00 |

OTHER PUBLICATIONS

German Office Action, Application No. 102017223160.2, 7 pages, dated Apr. 18, 2019.

* cited by examiner

METHOD FOR DETECTING AT LEAST ONE OBJECT PRESENT ON A MOTOR VEHICLE, CONTROL DEVICE, AND MOTOR VEHICLE

CROSS-REFERENCE TO RELATED APPLICATIONS

This application claims priority to German Patent Application No. DE 10 2017 223 160.2, filed on Dec. 19, 2017 with the German Patent and Trademark Office. The contents of the aforesaid Patent Application are incorporated herein for all purposes.

TECHNICAL FIELD

The invention relates to a method for detecting at least one object present on a motor vehicle. The method can be used to detect whether an object is leaning on the motor vehicle or is touching the motor vehicle. The invention also relates to a control device, by means of which the method according to the invention can be carried out, and a motor vehicle comprising the control device.

BACKGROUND

An automated driving function in which the motor vehicle is guided in an autonomous or automated manner by means of an autopilot of the motor vehicle must be able to independently detect whether it is possible to drive off or start up after a period of standstill. For this purpose, it must in particular be ensured that no objects and/or people are leaning directly on the motor vehicle. If the autopilot were then to drive off, these objects could be damaged. An example of such an automated driving function of an autopilot is the so-called parking garage pilot, which makes it possible to drive the motor vehicle out of a parking garage and to a user without vehicle passengers, in particular without a driver, in response to a call signal or start signal.

It is known from the prior art that a motor vehicle can monitor its surroundings or outer region by means of at least one camera.

It is known, for example from US 2001/0019356 A1, that a motor vehicle can detect other road users, parking cars and pedestrians by means of a camera. For this purpose, however, elaborate image processing is required in order to reliably detect the various shapes of these objects. Also implementing this image processing for detecting objects present on the motor vehicle would entail an undesirably high level of complexity.

An autopilot for a motor vehicle is disclosed in EP 1 394 761 A2. This autopilot can detect obstacles by means of a camera. However, this requires the use of two cameras as well as a complex image transformation process. Other technologies, for example ultrasound, also present drawbacks at close range.

A method for driving a motor vehicle in a partially automated manner is known from DE 10 2016 218 425 A1, in which method objects with which the motor vehicle could collide upon start-up are detected. In this case, the object detection is to be carried out by a processing apparatus that generates a release signal for start-up. Both the vehicle's own sensors and sensors provided in the infrastructure are used for this. In this way, objects that are located on or are leaning on the motor vehicle can also be detected.

A method for intelligent vehicle access point opening is known from DE 10 2016 118 949 A1, sensors being used for a trunk lid or tailgate to be opened to determine whether objects are leaning or resting on the roof. Force sensors and ultrasound sensors are used for this. The objects are for example objects in the trunk or on the loading surface that are to be prevented from falling out when the trunk lid or tailgate is opened.

A method for preventing a collision between a lid of a vehicle and obstacles located in the pivot area is known from DE 10 2010 009 889 A1, in which method a light pattern is generated in the pivot area by means of a lighting apparatus of the vehicle and detected by means of a camera. The camera is directed toward the vehicle surroundings and, although it detects the pivot area of the lid, it does not detect the outer surface of the motor vehicle.

SUMMARY

An object of the invention is to detect whether at least one object is leaning on the motor vehicle or is contacting the motor vehicle when the motor vehicle is parking or standing still.

The object is solved by the subject matter of the independent claims. Embodiments of the invention are described in the dependent claims, the following description and in the FIGS..

DESCRIPTION

Figure 1:
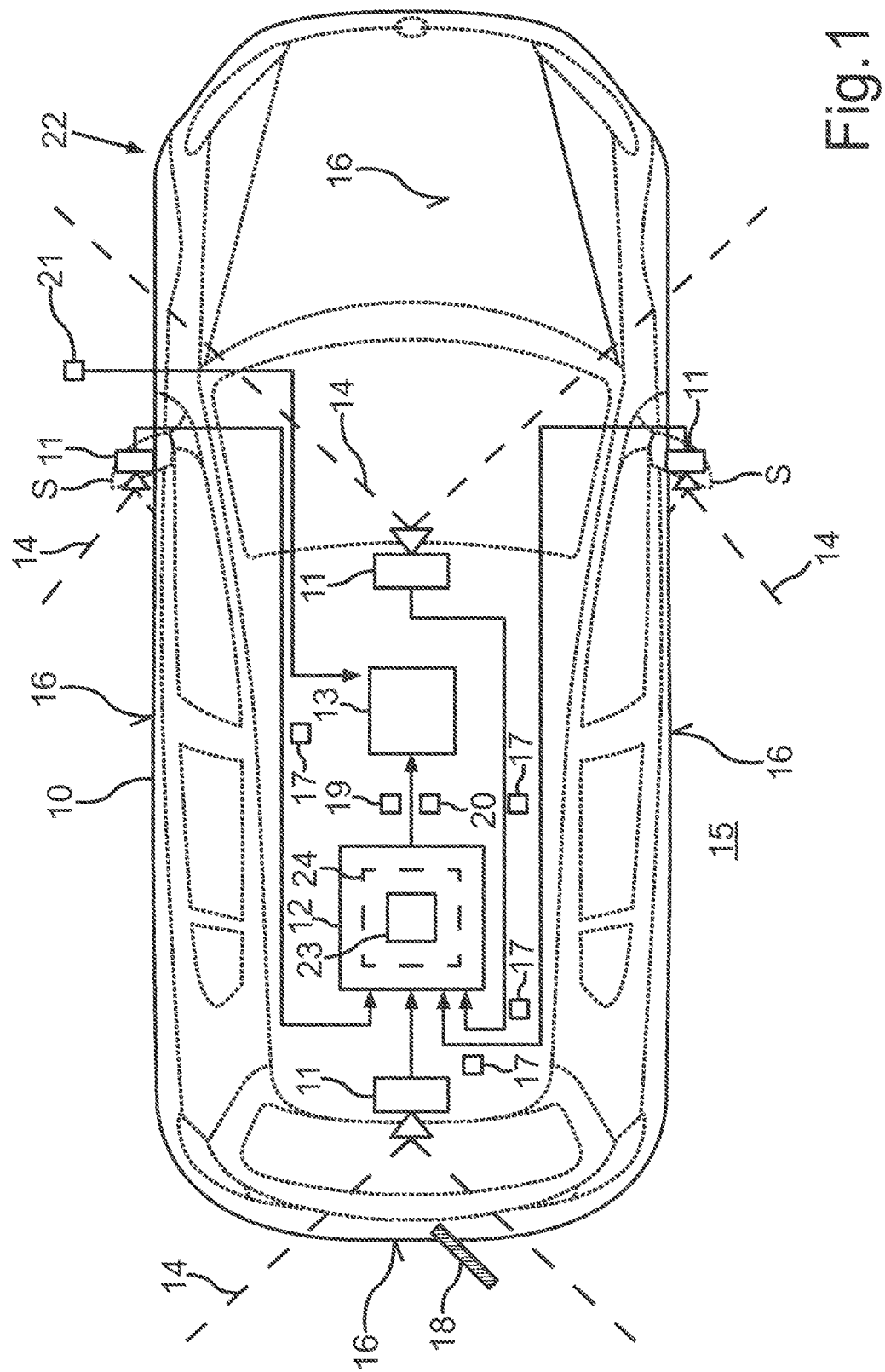
FIG. 1 is a schematic representation of an embodiment of a motor vehicle.

In one exemplary aspect, a method is provided for detecting at least one object present on a motor vehicle. Such an object may for example be an item or a person in each case. In the method of the present aspect, by way of a control device, at least one camera image is captured by means of a camera. The detection region of the camera is directed to an outer region of the motor vehicle. In other words, the surroundings of the motor vehicle are detected. In this case, however, the detection region is directed partially or entirely to an outer surface of the motor vehicle. In other words, part of the motor vehicle itself is imaged by means of the camera.

In order to dispense with having to carry out cumbersome object detection for detecting at least one object present, for a clearance test, i.e., for the verification that no object is present on the motor vehicle, it is checked in the at least one camera image by an image analysis apparatus of the control device if at least one predetermined intrinsic structure of the motor vehicle is imaged. It is therefore not checked whether an object is detectable, but rather it is checked whether at least one intrinsic structure of the motor vehicle itself can be detected. Although the image analysis apparatus for detecting at least one object is not able to assume that the optical properties of the object are known and therefore the detection of the object is correspondingly complex, in the method according to the present aspect, the sought optical property of the at least one predetermined intrinsic structure of the motor vehicle is already known. It is even possible to also know the location or position of the sought at least one intrinsic structure in the at least one camera image. In the event that the at least one intrinsic structure cannot be found by the image analysis apparatus, i.e., cannot be detected, a blocking signal, which indicates that an object is present on the motor vehicle, is generated. In other words, if an intrinsic structure cannot be found, it is assumed that said intrinsic structure is obviously covered or hidden by at least one object. In other words, the at least one object is therefore in the line of sight between the camera and the sought at least one predetermined intrinsic structure of the motor vehicle. In this way, it can be assumed that an object is present on the vehicle or is at least close enough to the motor vehicle to be classified as present. If, however, the at least one intrinsic structure is detected in the method, a clearance signal can be generated by the control device, which clearance signal indicates that the motor vehicle is not in contact with anything else or is standing freely in the detection region of the camera, i.e., no object has been detected to be present on the motor vehicle in the detection region of the camera. Said clearance signal can then be corroborated or verified by means of additional sensor data. In addition, the direction of the object present can be signaled. For example, the direction may be displayed.

The present aspect provides the benefit that, by searching for the at least one predetermined intrinsic structure in the at least one camera image, it can be reliably detected with little effort whether or not an object is present on the motor vehicle. The image analysis apparatus may for example be designed as a program module for a processor of the control device. The before mentioned method may for example be exclusively carried out when the motor vehicle is standing still, i.e., when a change of the free state can be brought about by an object that is not controlled by the motor vehicle. This is particularly economical in terms of computing resources.

The invention also includes embodiments that produce additional benefits.

In one embodiment, a predetermined outer contour of the motor vehicle is sought as an intrinsic structure in the at least one camera image by means of the image analysis apparatus. In other words, a predetermined edge course is sought in the at least one camera image or it is checked whether said edge course is present. Said sought outer contour is the free-standing contour, i.e., a course of at least one edge of the like that has to be produced in the at least one camera image if no object is present on the motor vehicle in the detection region of the camera. An intrinsic structure in the form of an outer contour or edge course has the particular benefit that it can be reliably detected in the camera image, in particular also with little computing effort. For example, the intrinsic structure may merely be sought in a predetermined subregion of the camera image, based on which subregion it is known that the intrinsic structure must be located in said subregion when the motor vehicle is standing freely. This is based on the knowledge that the relative position of the intrinsic structure to the camera is known.

In one embodiment, a predetermined vehicle surface having at least one predetermined optical property and/or at least predetermined component of the motor vehicle is sought as an intrinsic structure in the at least one camera image by means of the image analysis apparatus. For example, the surface of a panel may be detected as a vehicle surface. Detecting a vehicle surface has the benefit that it can be identified where on the motor vehicle the object is present. A component as a possible intrinsic structure has the benefit that the shape thereof can be reliably recognized in a camera image. For this purpose, a correlation with a template of the component may for example be provided. If the component is not detected in the camera image, the line of sight between the camera and component is interrupted by a present object. This can be reliably detected.

In one embodiment, with regard to the vehicle surface, at least one predetermined color and/or at least one predetermined contrast ratio in a predetermined subregion of the at least one camera image can be sought as the optical property. The predetermined optical property thus relates to the color and/or contrast of the vehicle surface. This has the benefit that the color and/or the contrast can be used as a basis for detecting the intrinsic structure of the motor vehicle even in the event of a detection situation in which edges cannot be discerned, for example in the event of fog.

It has previously been described that only for the detection area of a single camera it is checked whether an object is in contact with the motor vehicle within the detection area. Of course, the method may also be carried out for a plurality of cameras, i.e., the clearance test described can be carried out for each of the cameras. In an embodiment, at least one camera image is received in each case by the control device from at least one additional camera, the entire motor vehicle being covered by the detection regions of all cameras taken together and the clearance test being carried out for each of the cameras. In other words, a sufficient number of detection regions are provided such that the motor vehicle can be checked all over for a present object (clearance test). This has the benefit that the blocking signal is generated as soon as an object is present anywhere on the motor vehicle. "All over" in particular means the contour of the motor vehicle in a horizontal plane. The roof and/or base of the motor vehicle may also be checked, the term "all over" in this case meaning only a side or lateral check (right and left sides and front and back).

In one embodiment, a start signal for driving off is received by an autopilot of the motor vehicle and the autopilot only drives off, i.e., the motor vehicle is only moved, if there is no blocking signal. For this purpose, the autopilot may be provided for an autonomous journey or for autonomous driving of the motor vehicle by means of a control unit. The start signal may be received from outside the motor vehicle, for example from a remote control of a user or from the Internet. In other words, after or upon receipt of the start signal, the clearance test can be carried out and thus it can be detected whether the motor vehicle is standing freely. Only in this case does the autopilot start up the motor vehicle. Otherwise, the motor vehicle remains stationary.

In addition to detecting at least one intrinsic structure of the motor vehicle, according to one embodiment, a base structure of a subsurface on which the motor vehicle is standing is also sought in the at least one camera image by means of the image analysis apparatus and the blocking signal is also generated if the base structure cannot be found (in the at least one camera image). In other words, it is checked whether the line of sight from the camera to the base or subsurface is unobstructed. This is the case if the base structure of the subsurface can be detected. This produces the benefit that an object located under the motor vehicle and projecting into the detection region of the camera can also be detected, even if it is located "behind" the contour of the motor vehicle from the perspective of the camera.

In order to dispense with having to carry out laborious image analysis using shape recognition during detection of an intrinsic structure and/or a base structure, according to one embodiment, at least one reference image of the outer region is beneficially generated by means of the image analysis apparatus at at least one point in time prior to the clearance test. In other words, the detection region is photographed by means of the at least one camera prior to the clearance test. This produces the at least one reference image. With regard to the reference image, it is assumed that this is captured in a free state, i.e., when no object is present on the motor vehicle. For example, after the motor vehicle is locked, a user can be prompted to trigger the capture of the at least one reference image if for example the user considers or has checked that the motor vehicle is standing freely. The at least one reference image may also be generated when the motor vehicle stops and/or during a predetermined period of time after stopping (e.g. within the first 10 seconds). In this case, too, it can be assumed that no object is leaning against the motor vehicle. During the later clearance test, an image comparison of the at least one camera image with the at least one reference image is then carried out. In other words, the at least one camera image must have the same image content as the at least one reference image in order for the motor vehicle to be detected as free-standing. If a difference between the at least one camera image and the at least one reference image is detected during the image comparison, the blocking signal is then generated. The image comparison may also be limited to a predetermined subregion of the at least one camera image. Said subregion may relate to the image region in which the motor vehicle itself must be shown in the at least one camera image if the motor vehicle is standing freely. Additionally or alternatively, the comparison may be limited to one or some image properties from several predetermined image properties, e.g. the edges and/or pattern (textures). This is because not all image properties, e.g. the color and/or brightness, are suitable for an image comparison on account of the changing light conditions during standstill.

According to another exemplary aspect, a control device is provided for a motor vehicle for carrying out the method according to the first aspect. The control device may for example be designed as one control unit or as a group of several control units. The control device comprises a processor, which is configured to carry out an embodiment of the method according to the first aspect. The processor may comprise at least one microcontroller and/or at least one microprocessor for this purpose. The method steps can be implemented by means of a program code for the processor. The program code can be stored in a data memory of the processor.

Finally, a further exemplary aspect relates to a motor vehicle comprising at least one camera, the detection region of which is directed to an outer region of the motor vehicle and partially or entirely directed to an outer surface of the motor vehicle. Furthermore, according to one embodiment of the control device, the control device can be coupled to the at least one camera. The motor vehicle may comprise an autopilot, in which the vehicle can be blocked or prevented from driving off by means of a blocking signal of the control device. The motor vehicle may be designed as an automobile, for example a passenger car or a truck.

The invention also includes the combinations of the above-described embodiments.

In the following, other exemplary embodiments are described.

In the exemplary embodiments discussed in the following, the described components of the embodiments represent individual features of the invention that should be considered independent of each other and should be considered as a part of the invention both individually or in a combination other than that portrayed. In addition, the described embodiments can also be supplemented by features other than those already described.

Elements having the same functions are, in each case, provided with the same reference numerals in the FIGS.

FIG. 1 shows a motor vehicle 10 which may be an automobile, for example a passenger car or a truck. The motor vehicle 10 may comprise one or more cameras 11 and a control device 12 as well as an optional autopilot 13. Detection regions 14 of the cameras 11 may be directed to the surroundings or to an outer region 15 outside the motor vehicle 10. In this case, however, the detection regions 14 are directed such that part of an outer surface 16 of the motor vehicle 10 is always covered by the detection region 14 in each detection region 14, and therefore part of the motor vehicle 10 is always imaged in camera images 17 of the cameras 11 when the motor vehicle 10 is standing freely. A relevant camera 11 may for example be arranged in each case in a side mirror S of the motor vehicle 10 for this purpose. One camera 11 may be a front camera, which is for example arranged in a roof module and that can be directed toward the front of the vehicle. One camera 11 may for example be a reversing camera, which may be arranged in the rear of the motor vehicle 10. The above-described orientation of the detection regions 14 is produced in particular during operation of the relevant camera 11. In the off state, a camera 11 can easily also be retracted or lowered.

The camera images 17 of at least one of the cameras 11 can be received by the control device 12 from the relevant camera 11. The control device 12 can then decide, based on the camera images 17, whether the motor vehicle 10 is standing freely or whether, in contrast, at least one object 18 is leaning on the motor vehicle 10. If the motor vehicle 10 is standing freely and this is detected by the control device 12, a clearance signal 19 can be generated and output to the autopilot 13, for example. If the control device 12 detects, based on the camera images 17, that an object 18 is leaning against the motor vehicle or is present on the motor vehicle 10, the control device 12 can generate a blocking signal 20 and output same to the autopilot 13, for example, and optionally also output at least one additional signal to at least one other component (e.g. a sensor or an algorithm). By means of the blocking signal 20, the autopilot 13 can be blocked or prevented from driving off in response to a start signal 21 and thus causing the object 18 to fall over, for example. The start signal 21 may for example be received from a remote control of a user or from the Internet and it may prompt the motor vehicle 10 to leave its current parking space 22.

The control device 12 may comprise an image analysis apparatus 23 for detecting the at least one object 18 or the motor vehicle 10 standing freely. The image analysis apparatus 23 may be implemented on the basis of a program module for a processor apparatus 24 of the control device 12.

Figure 2:
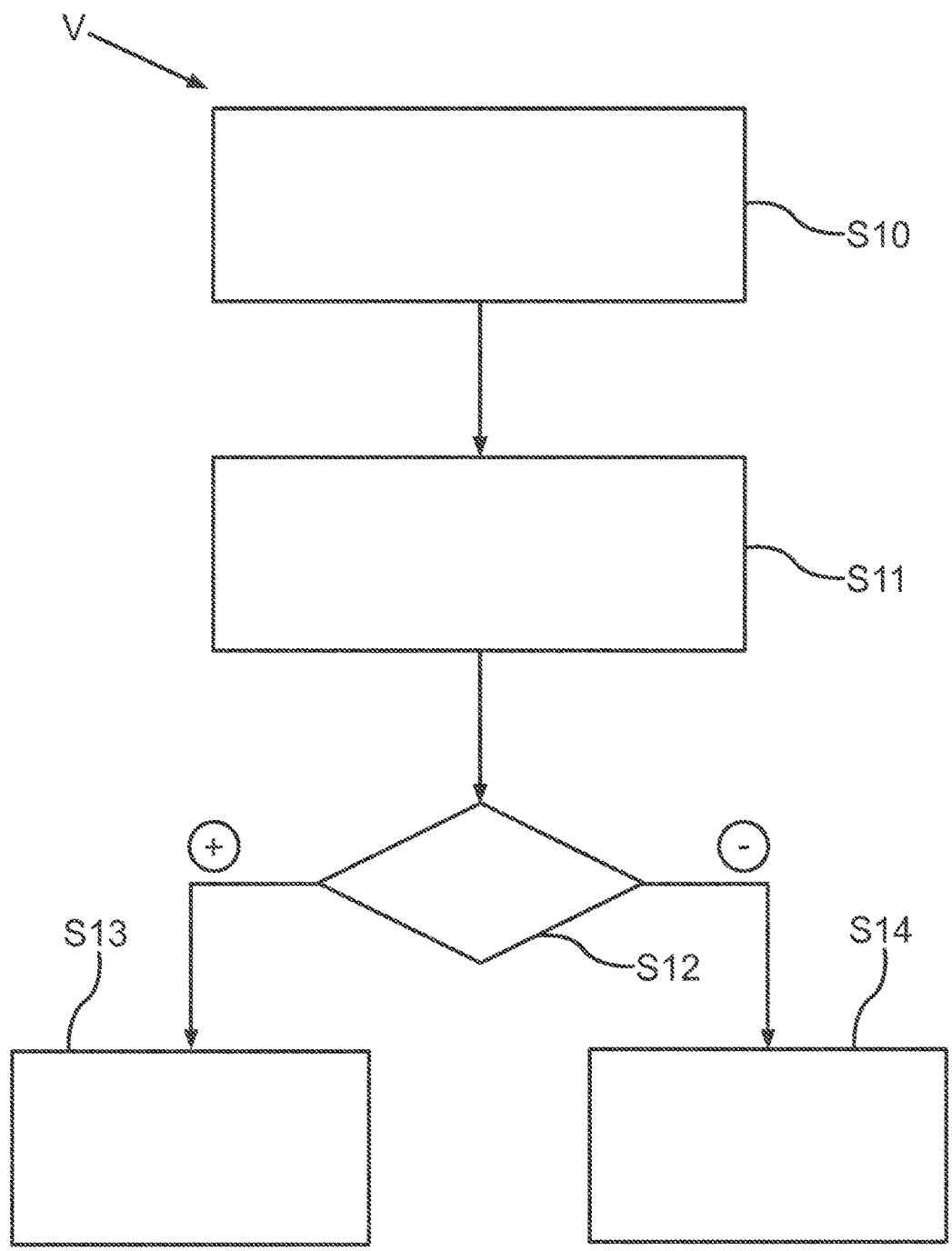
FIG. 2 is a flow chart of an embodiment of a method.

FIG. 2 shows a method V that can be implemented by the control device 12 in order to either generate the clearance signal 19 or the blocking signal 20 depending on the camera images 17.

In a step S10, the camera images 17 generated by the camera 11 can be detected or received by the control device.

In the following, step S11 will be explained with reference to FIG. 3.

Figure 3:
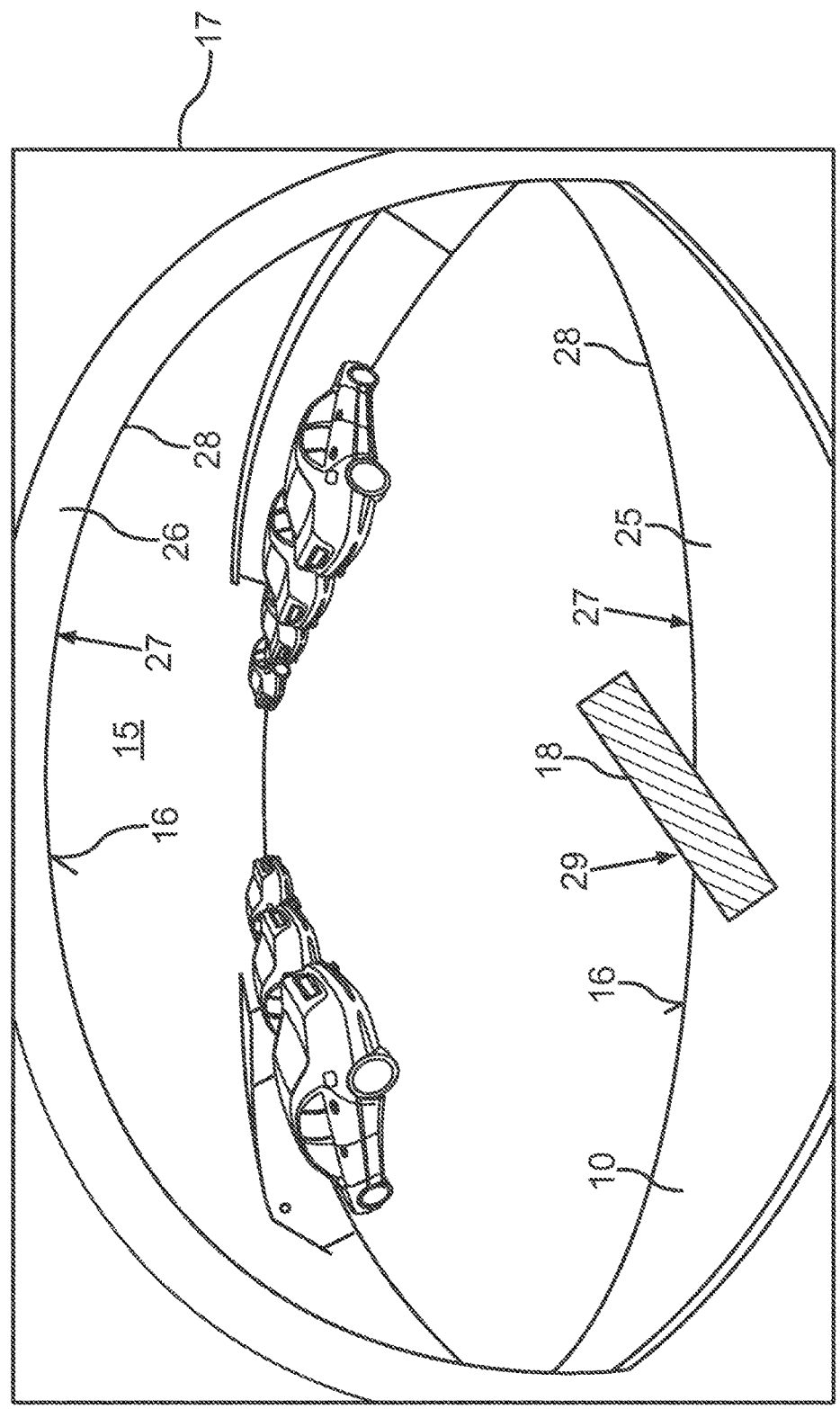
FIG. 3 is a schematic representation of a camera image, in which an intrinsic structure is being sought by means of a control device of the motor vehicle.

FIG. 3 shows, by way of example, a camera image 17 of the like that may have been produced, for example, by a rear camera of the motor vehicle 10. Part of the outer region 15 can be imaged in the camera image 17. Furthermore, outer surfaces 16 of a rear bumper 25 and a roof edge 26, for example, can also be imaged.

In the step S11, the image analysis apparatus 23 can check whether at least one predetermined intrinsic structure 27 of the motor vehicle 10 is imaged in the camera image 17. The intrinsic structure 27 may for example be an outer contour or an edge course 28 of the like that would be produced in the camera image 17 from the point of view or perspective of the camera 11 if the motor vehicle 10 is standing freely. In the example shown in FIG. 3, the object 18 is leaning against the motor vehicle 10 such that the intrinsic structure 27 in the form of an edge course 28 features an interruption 29 at the point at which the object 18 is leaning against the motor vehicle 10. The interruption 29 is produced because the object 18 is hiding or covering the intrinsic structure 27 in the form of the edge course 28. Therefore, the intrinsic structure 27 in the form of the edge course 28 cannot be detected by the image analysis apparatus 23 in the camera image 17. The intrinsic structure 27 therefore cannot be found by the image analysis apparatus 23.

In a step S12 (see FIG. 2), the control device 12 can check whether the image analysis apparatus 23 was able to detect the intrinsic structure 27 in the camera image 17. If this is the case (symbolized by a "+" sign in FIG. 2), in a step S13, the clearance signal 19 can be generated, which signals that no object is present on the motor vehicle 10 in the relevant detection region 14 of the relevant camera 11.

However, if it is determined in the step S12 that the intrinsic structure 27 cannot be found, i.e. cannot be detected or cannot be fully detected in the camera image 17 (symbolized by a "−" sign in FIG. 2), in a step S14, the blocking signal 20 can be generated. The blocking signal 20 signals that an object 18 is present on the motor vehicle 10 in the relevant detection region 14 of the relevant camera 11.

Therefore, the viewing region or detection region, including the vehicle contour, is monitored by means of a camera, which may for example be arranged in a side mirror S of the motor vehicle 10.

An image analysis apparatus or image processing system checks whether static vehicle parts and vehicle contours are visible or not hidden. As a result, people or objects (general objects), for example, in the immediate vicinity of the motor vehicle 10 can be detected, even if they are highly distorted or only partially visible.

The method is based on monitoring known structures on the motor vehicle. For this purpose, the fact of an intrinsic structure of the motor vehicle being hidden can be detected by means of an image processing operation that is easy to implement, for example an analysis of an edge course. According to one exemplary embodiment, edge courses are detected in a camera image of a side camera initially in the normal state or free-standing state (no obstacles present). The edge courses are defined by the bodywork or outer surface visible in the camera image. If an item or a person, i.e. generally an object, is concealing the otherwise visible outer surface or bodywork, the free visible contour or the edge course is broken. An obstacle is reported via a corresponding blocking signal.

Other embodiments may include an evaluation of the visibility of the base structure and/or a specific vehicle surface and the properties thereof (contrast and/or color).

However, the detection of an intrinsic structure is less dependent on the environmental conditions and can be implemented by means of more simple image processing.

By virtue of the method, it is now possible to optically sense obstacles present on the motor vehicle.

Overall, the example shows how the invention can provide for optical sensing of obstacles present on the motor vehicle.

LIST OF REFERENCE NUMERALS

10 Motor vehicle
11 Camera
12 Control device
13 Autopilot
14 Detection region
15 Outer region
16 Outer surface
17 Camera image
18 Object
19 Clearance signal
20 Blocking signal
21 Start signal
22 Parking space
23 Image analysis apparatus
24 Processor apparatus
25 Bumper
26 Roof edge
27 Intrinsic structure
28 Edge course
29 Interruption/Concealment
S Side mirror
V Method The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for detecting at least one object resting against a motor vehicle, comprising:
    capturing at least one camera image using a camera, wherein a detection region of the camera is directed to an outer region of the motor vehicle and partially or entirely to an outer surface of the motor vehicle; and
    determining, for a clearance test, in the at least one camera image by an image analysis apparatus of a control device if at least one predetermined intrinsic structure of the motor vehicle is imaged;
    in the event that the at least one intrinsic structure cannot be found by the image analysis apparatus, generating a blocking signal for at least an autopilot of the motor vehicle, which blocking signal indicates that an object is resting against the motor vehicle; and
    receiving, by the autopilot of the motor vehicle, a start signal for at least partially automatic driving, wherein the autopilot only starts to drive if there is no blocking signal.

2. The method of claim 1, comprising searching for a predetermined outer contour or edge course of the motor vehicle as the at least one intrinsic structure in the at least one camera image by the image analysis apparatus.

3. The method of claim 2, comprising searching for one or more of a predetermined vehicle surface having at least one predetermined optical property and at least a predetermined component of the motor vehicle an the at least one intrinsic structure by the image analysis apparatus.

4. The method of claim 2, wherein at least one camera image is received by the control device from at least one additional camera, wherein the entire motor vehicle is covered by the detection regions of all cameras taken together and the clearance test is carried out for each of the cameras.

5. The method of claim 2, comprising searching for a base structure of a subsurface on which the motor vehicle is standing in the at least one camera image by the image analysis apparatus and generating the blocking signal if the base structure cannot be found.

6. The method of claim 1, comprising searching for one or more of a predetermined vehicle surface having at least one predetermined optical property and at least a predetermined component of the motor vehicle as the at least one intrinsic structure by the image analysis apparatus.

7. The method of claim 6, comprising searching for one or more of at least one predetermined color and at least one predetermined contrast ratio in a predetermined subregion of the at least one camera image as the optical property.

8. The method of claim 7, wherein at least one camera image is received by the control device from at least one additional camera, wherein the entire motor vehicle is covered by the detection regions of all cameras taken together and the clearance test is carried out for each of the cameras.

9. The method of claim 6, wherein at least one camera image is received by the control device from at least one additional camera, wherein the entire motor vehicle is covered by the detection regions of all cameras taken together and the clearance test is carried out for each of the cameras.

10. The method of claim 6, comprising searching for a base structure of a subsurface on which the motor vehicle is standing in the at least one camera image by the image analysis apparatus and generating the blocking signal if the base structure cannot be found.

11. The method of claim 1, wherein at least one camera image is received by the control device from at least one additional camera, wherein the entire motor vehicle is covered by the detection regions of all cameras taken together and the clearance test is carried out for each of the cameras.

12. The method of claim 1, comprising searching for a base structure of a subsurface on which the motor vehicle is standing in the at least one camera image by the image analysis apparatus and generating the blocking signal if the base structure cannot be found.

13. The method of claim 1, wherein at least one reference image of the outer region is generated at the image analysis apparatus at at least one point in time prior to the clearance test and, during the clearance test, an image comparison of the at least one camera image with the at least one reference image is carried out.

14. A control device for a motor vehicle, comprising a processor that is configured to carry out the method of claim 1.

15. A motor vehicle comprising at least one camera, the detection region of which is directed to an outer region of the motor vehicle and partially or entirely to an outer surface of the motor vehicle, comprising the control device of claim 14.

* * * * *